(No Model.)
J. N. BROWN.
VEHICLE GEAR.
No. 318,863. Patented May 26, 1885.
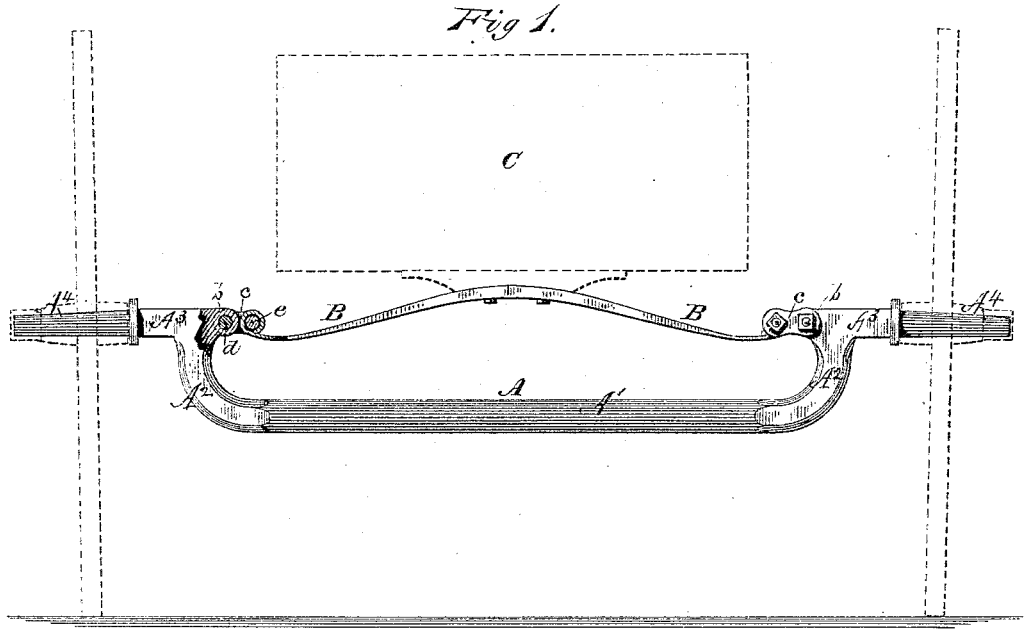
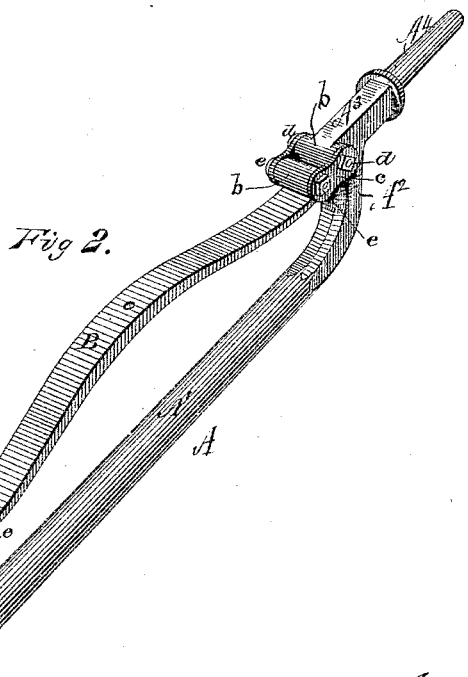
WITNESSES
Harry King
S. E. Somes
INVENTOR:
John N. Brown
By F. C. Somes,
Attorney.

UNITED STATES PATENT OFFICE.

JOHN N. BROWN, OF NEW LONDON, CONNECTICUT, ASSIGNOR TO THE BROWN CARRIAGE COMPANY, OF SAME PLACE.

VEHICLE-GEAR.

SPECIFICATION forming part of Letters Patent No. 318,863, dated May 26, 1885.

Application filed September 25, 1884. (No model.)

*To all whom it may concern:*

Be it known that I, JOHN N. BROWN, a citizen of the United States of America, residing at New London, in the county of New London, in the State of Connecticut, have invented a new and useful Improvement in Vehicles, of which the following is a specification sufficient full, clear, and exact to enable any person skilled in the art to make and use the invention.

This invention relates to the construction of the axles and connection of the springs thereto.

The object of the invention is to provide a simple means of connecting springs with crank-axles without the use of clips, and in such manner as to permit lateral expansion of spring and secure a low setting of the vehicle-body.

In the accompanying drawings, Figure 1 is an end elevation of this improved vehicle, showing the axle and spring in full lines and the body and wheels in dotted lines. Fig. 2 is a perspective view of the axle and spring connected together in accordance with this invention.

Similar letters of reference indicate corresponding parts in both figures.

The crank-axle A, constructed of wrought iron, steel, or other suitable metal, comprises the axle-shanks $A^3$ $A^3$, provided at their outer ends with the axle-spindles $A^4$ $A^4$, and at their inner ends with the perforated ears $b\,b$, the depressed axle-body $A'$, and the dependent arms $A^2$ $A^2$, curved downward and inward and connecting said axle-body and axle-shanks, said parts being integral and in the same vertical plane. Links $c$ are pivoted at their outer ends to said ears by means of bolts $d$. A semi-elliptic or other suitable spring, B, is connected at its ends by means of bolts $e$ to the inner ends of said links. A vehicle-body, C, is connected directly or indirectly to said spring, and supported thereby at one end and by a similar or other suitable spring at the other end.

This vehicle is simple and economical in construction, and secures a low setting of the body thereof and ample play of the spring.

I claim as my invention—

1. A crank-axle composed of axle-shanks provided at their outer ends with axle-spindles and at their inner ends with perforated ears, a depressed axle-body, and dependent arms connecting said body with said axle-shanks, said parts being integral and in the same vertical plane, substantially as described.

2. The combination of a crank-axle composed of shanks provided at their outer ends with axle-spindles and at their inner ends with perforated ears, a depressed axle-body, and dependent arms connecting said body with said axle-shanks, said parts being integral and in the same vertical plane, pivoted links connected to said ears, and a spring connected to said links and in the same vertical plane with said axle-body, substantially as described.

JOHN N. BROWN.

Witnesses:
ORLANDO C. GORTON,
DANIEL LEE.